United States Patent
Dror et al.

(10) Patent No.: US 9,037,779 B2
(45) Date of Patent: May 19, 2015

(54) SYSTEMS AND METHODS FOR PERFORMING VARIABLE FLASH WEAR LEVELING

(75) Inventors: Itai Dror, Omer (IL); Alon Kipnis, Ma'ale Gamla (IL)

(73) Assignee: SanDisk Technologies Inc., Plano, TX (US)

( * ) Notice: Subject to any disclaimer, the term of this patent is extended or adjusted under 35 U.S.C. 154(b) by 72 days.

(21) Appl. No.: 13/330,217

(22) Filed: Dec. 19, 2011

(65) Prior Publication Data
US 2013/0159600 A1  Jun. 20, 2013

(51) Int. Cl.
*G06F 12/02* (2006.01)
(52) U.S. Cl.
CPC .... *G06F 12/0246* (2013.01); *G06F 2212/1036* (2013.01); *G06F 2212/401* (2013.01); *G06F 2212/7211* (2013.01)

(58) Field of Classification Search
USPC .......................... 711/103; 714/753, 755, 758
See application file for complete search history.

(56) References Cited

U.S. PATENT DOCUMENTS

| | | | | |
|---|---|---|---|---|
| 7,548,982 B2 * | 6/2009 | Gu et al. | | 709/228 |
| 7,716,332 B1 * | 5/2010 | Topfl et al. | | 709/226 |
| 8,244,959 B2 * | 8/2012 | Fusella et al. | | 711/103 |
| 8,341,501 B2 * | 12/2012 | Franceschini et al. | | 714/774 |
| 8,504,411 B1 * | 8/2013 | Subasic et al. | | 705/7.33 |
| 8,676,741 B2 * | 3/2014 | Ulinski et al. | | 706/52 |
| 2004/0128618 A1 * | 7/2004 | Datta | | 715/513 |
| 2008/0288863 A1 * | 11/2008 | Bohannon | | 715/255 |
| 2010/0281340 A1 | 11/2010 | Franceschini et al. | | |
| 2011/0145486 A1 * | 6/2011 | Owa et al. | | 711/103 |
| 2012/0047317 A1 * | 2/2012 | Yoon et al. | | 711/103 |
| 2013/0086302 A1 * | 4/2013 | Tressler et al. | | 711/103 |

FOREIGN PATENT DOCUMENTS

WO  2006/131915 A2  12/2006

OTHER PUBLICATIONS

International Search Report and Written Opinion for PCT/US2012/070074, mailed May 14, 2013, 8 pgs.
International Preliminary Report on Patentability and Written Opinion for PCT Application No. PCT/US2012/070074, dated Jun. 24, 2014, 6 pgs.

* cited by examiner

*Primary Examiner* — Tuan Thai
*Assistant Examiner* — Mohamed Gebril
(74) *Attorney, Agent, or Firm* — Brinks Gilson & Lione

(57) ABSTRACT

Systems and methods for performing wear leveling are disclosed. In one implementation, a controller partitions a memory block into at least a first partition and a second partition. The controller utilizes the first partition of the memory block for storage of data blocks until the first partition reaches a first end of life condition. After the first partition reaches the first end of life condition, the controller utilizes the first partition for storage of data blocks associated with a compression ratio that is less than a compression threshold until the first portion reaches a second end of life condition. The controller additionally utilizes the second partition for the storage of data blocks until the second partition reaches the first end of life condition.

20 Claims, 10 Drawing Sheets

SYSTEMS AND METHODS FOR PERFORMING VARIABLE FLASH WEAR LEVELING

BACKGROUND

With the reduction in the size of NAND flash storage devices, the endurance of the NAND flash storage devices has also decreased as compared with previous generations of NAND flash storage devices. The reduction in endurance is due to smaller floating gate areas and a decrease in an amount of electron charges that are responsible for storing data. In order to increase an endurance of current NAND flash storage systems, the storage system may utilize wear leveling that attempts to maintain all NAND memory blocks at approximately the same endurance condition. In one example, a storage device controller may count a number of write and erase cycles to each NAND memory blocks and store data into the least used memory blocks. In another example, a storage device controller measures an error condition of the memory blocks and writes data to the data block with the best error condition. Additional wear leveling techniques are desirable that further increase the endurance of NAND flash storage devices.

SUMMARY

The present disclosure is directed to systems and methods for performing variable flash wear leveling. In one aspect, a method for performing wear leaving is disclosed. A memory block of a storage device is partitioned into at least a first partition and a second partition. The first partition of the memory block is utilized for the storage of data blocks until the first partition reaches a first end of life condition. After the first partition reaches the first end of life condition, the first partition of the memory block is utilized for storage of data blocks associated with a compression ratio that is less than a compression threshold until the first partition reaches a second end of life condition. Additionally, the second partition of the memory block is utilized for the storage of data blocks until the second partition reaches the first end of life condition.

In another aspect, a storage system is disclosed that includes a non-volatile memory and a processor in communication with the non-volatile memory. The processor is configured to partition a memory block of the non-volatile memory into at least a first partition and a second partition. The processor is configured to utilize the first partition of the memory block to store data blocks until the first partition reaches a first end of life condition. After the first partition reaches the first end of life condition, the processor is configured to utilize the first partition of the memory block to store data blocks associated with a compression ratio that is less than a compression threshold until the first partition reaches a second end of life condition. The processor is further configured to utilize the second partition to store data blocks until the second partition reaches the first end of life condition.

In another aspect, another method for performing wear leveling is disclosed. A first memory block of a storage device is associated with a first compression threshold and a second memory block of the storage device is associated with a second compression threshold. The second compression threshold is less than the first compression threshold. A request is received to store data blocks in the store device and a compression ratio associated with the data blocks is determined. A determination is made whether to store the data blocks in the first memory block or the second memory block based on the compression ratio associated with the data blocks and the first and second compression thresholds.

In another aspect, another storage system is disclosed that includes a non-volatile memory and a processor in communication with the non-volatile memory. The processor is configured to associate a first memory block of the non-volatile memory with a first compression threshold and to associate a second memory block of the non-volatile memory with a second compression threshold, where the second compression threshold is less than the first compression threshold. The processor is further configured to receive a request to store data blocks in the storage device and to determine a compression ratio associated with the data blocks. The processor is additionally configured to determine whether to store the data blocks in the first memory block or the second memory block based on the compression ratio associated with the data blocks and the first and second compression thresholds.

DETAILED DESCRIPTION OF THE DRAWINGS

The present disclosure is directed to systems and methods for performing variable flash wear leveling. As explained in more detail below, a controller located in a host device or a store device utilizes at least a portion of a memory block to store data blocks until the portion of the memory block reaches a first end of life condition. To extend the life of the portion of the memory block, after the memory block reaches the first end of life condition, the controller only stores compressed data blocks to the portion of the memory block until the memory block reaches a second end of life condition. By storing only compressed data blocks in the portion of the memory block after the memory block reaches the first end of life condition, the controller is able to use an increased number of parity bits to detect errors in the stored data and extend the endurance of the memory block.

For example, in some implementations, a memory block of a storage device is partitioned into two or more partitions. A controller stores data blocks in a first partition of the memory block until the first partition reaches a first end of life condition. After the first partition reaches the first end of life condition, the controller utilizes the first partition to store data blocks that are associated with a compression ratio that is less than a compression threshold of the first partition until the first partition reaches a second end of life condition. It should be appreciated that in the current application, the lower a compression ratio associated with a data block, the more the data block is compressed. In other words, a data block associated with a lower compression ratio is more compressed than a data block associated with a higher compression ratio.

In ideal conditions, after the first partition reaches the first end of life condition, the controller additionally utilizes the second partition to store data blocks. However, in non-ideal conditions such as when a controller has no other area to store a data block, the controller may begin storing data blocks in the second partition before the first partition reaches the first end of life condition. The controller continues to utilize the second partition to store data blocks until the second partition reaches the first end of life condition.

In other implementations, a storage device includes a plurality of memory blocks. During operation, a controller stores data to one of the memory blocks until the memory block reaches a first end of life condition. After the memory block reaches the first end of life condition, the controller stores data blocks in the memory block that are associated with a compression ratio that is less than a compression threshold associated with the memory block until the memory block reaches a second end of life condition.

Figure 1:
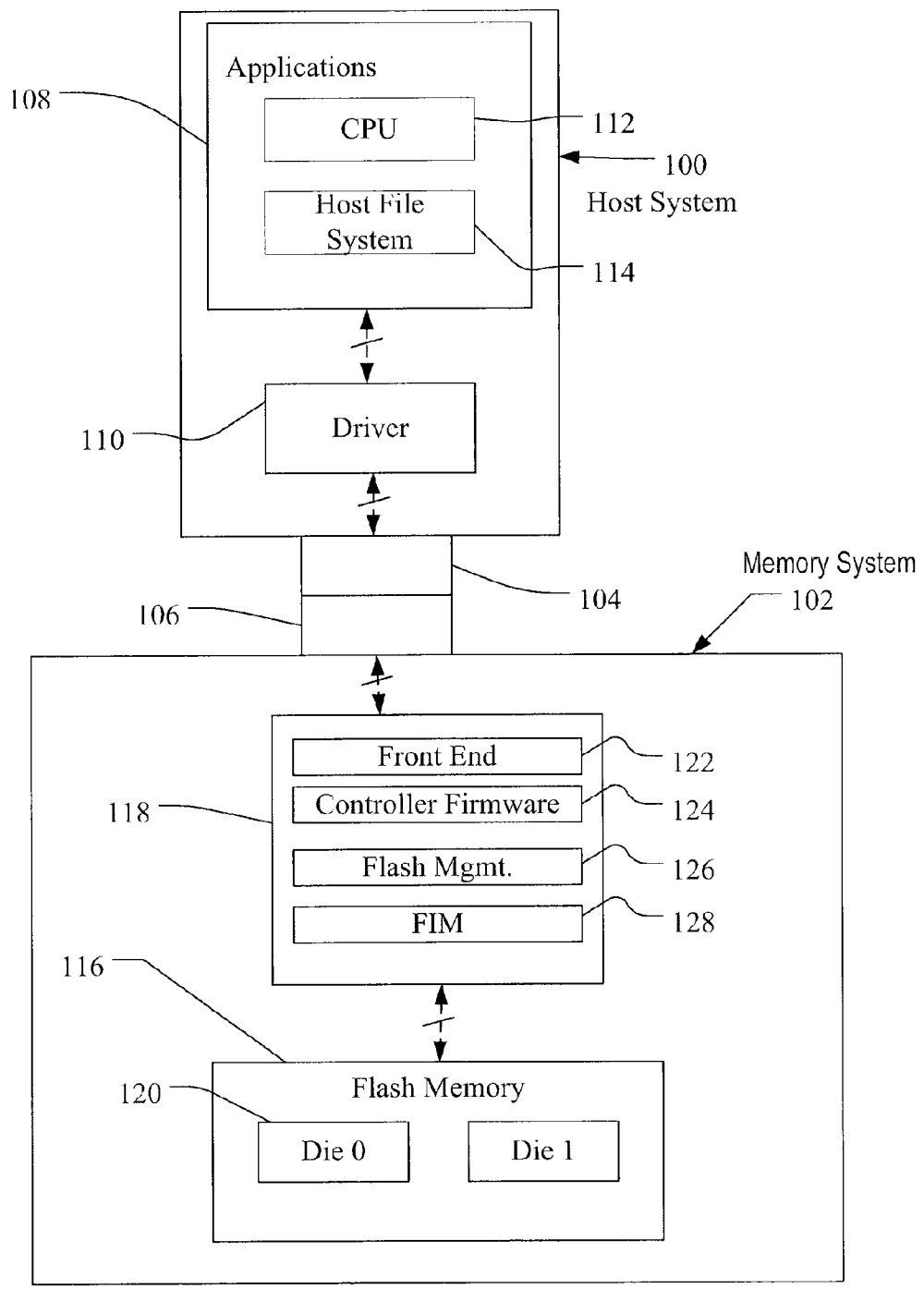
FIG. 1 illustrates a host connected with a memory system having a multi-bank non-volatile memory containing multiple die that may implement the disclosed variable flash wear leveling methods.

A flash memory system suitable for use in implementing aspects of the invention is shown in FIGS. 1-6. A host system 100 of FIG. 1 stores data into and retrieves data from a memory system 102. The memory system may be flash memory embedded within the host, such as in the form of a solid state disk (SSD) drive installed in a personal computer. Alternatively, the memory system 102 may be in the form of a card that is removably connected to the host through mating parts 104 and 106 of a mechanical and electrical connector as illustrated in FIG. 1. A flash memory configured for use as an internal or embedded SSD drive may look similar to the schematic of FIG. 1, with the primary difference being the location of the memory system 102 internal to the host. SSD drives may be in the form of discrete modules that are drop-in replacements for rotating magnetic disk drives.

The host system 100 of FIG. 1 may be viewed as having two major parts, in so far as the memory system 102 is concerned, made up of a combination of circuitry and software. They are an applications portion 108 and a driver portion 110 that interfaces with the memory system 102. In a PC, for example, the applications portion 108 can include a processor 112 running word processing, graphics, control or other popular application software, as well as the file system 114 for managing data on the host 100. In a camera, cellular telephone or other host system that is primarily dedicated to perform a single set of functions, the applications portion 108 includes the software that operates the camera to take and store pictures, the cellular telephone to make and receive calls, and the like.

The memory system 102 of FIG. 1 may include non-volatile memory, such as flash memory 116, and a system controller 118 that both interfaces with the host 100 to which the memory system 102 is connected for passing data back and forth and controls the memory 116. The system controller 118 may convert between logical addresses of data used by the host 100 and physical addresses of the flash memory 116 during data programming and reading. The flash memory 116 may include any number of memory die 120 and two memory die are shown in FIG. 1 simply by way of illustration. Functionally, the system controller 118 may include a front end 122 that interfaces with the host system, controller logic 124 for coordinating operation of the memory 116, flash management logic 126 for internal memory management operations such as garbage collection, and one or more flash interface modules (FIMs) 128 to provide a communication interface between the controller with the flash memory 116.

Figure 2:
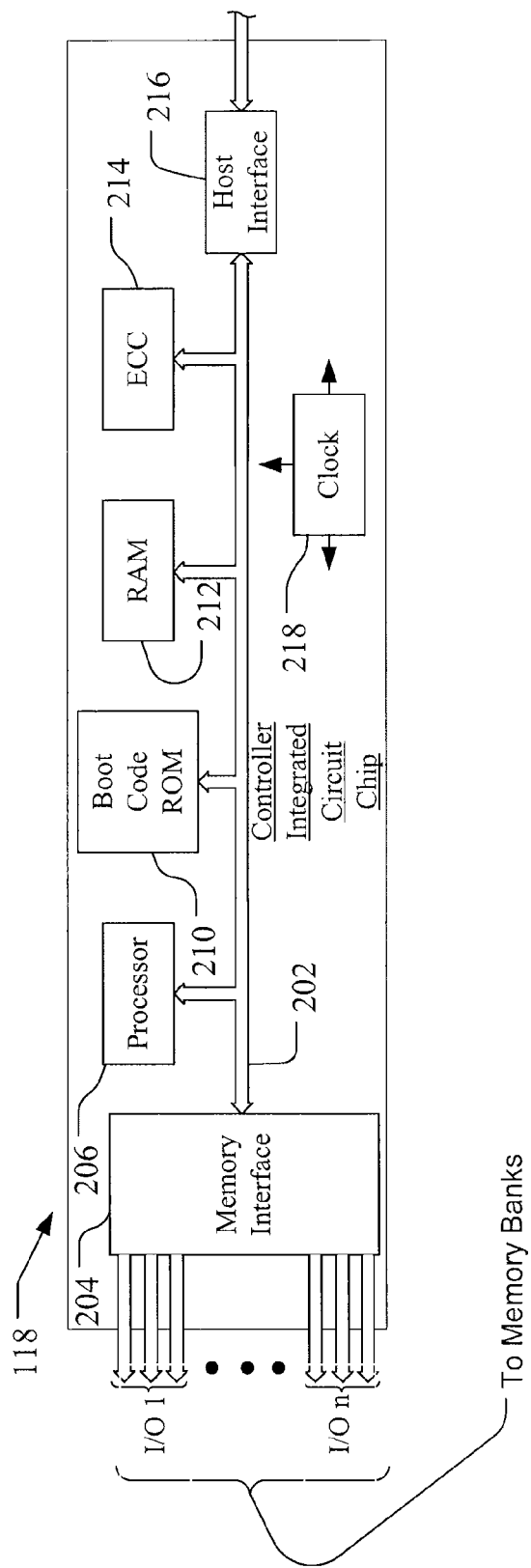
FIG. 2 is an example block diagram of an example flash memory system controller for use in the multiple die non-volatile memory of F FIG. 1.

The system controller 118 may be implemented on a single integrated circuit chip, such as an application specific integrated circuit (ASIC) such as shown in FIG. 2. The processor 206 of the system controller 118 may be configured as a multi-thread processor capable of communicating separately with each of the respective memory banks 120 via a memory interface 204 having I/O ports for each of the respective banks 120 in the flash memory 116. The system controller 118 may include an internal clock 218. The processor 206 communicates with an error correction code (ECC) module 214, a RAM buffer 212, a host interface 216, and boot code ROM 210 via an internal data bus 202.

Figure 3:
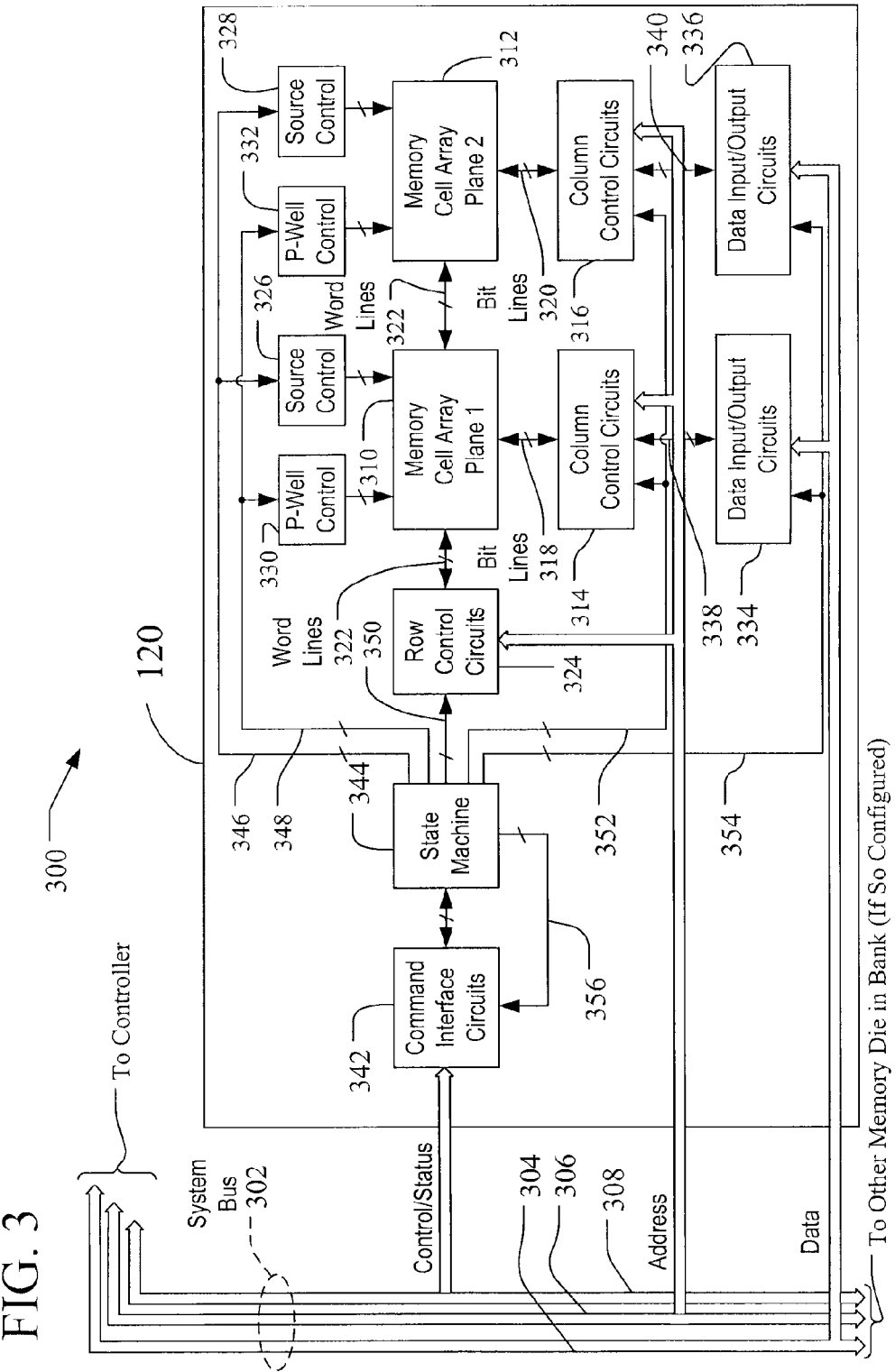
FIG. 3 is an example one flash memory bank suitable as one of the non-volatile memory banks illustrated in FIG. 1.

Each die 120 in the flash memory 116 may contain an array of memory cells organized into multiple planes. One of FIG. 3 shows such planes 310 and 312 for simplicity but a greater number of planes, such as four or eight planes, may instead be used. Alternatively, the memory cell array of a memory bank may not be divided into planes. When so divided, however, each plane has its own column control circuits 314 and 316 that are operable independently of each other. The circuits 314 and 316 receive addresses of their respective memory cell array from the address portion 306 of the system bus 302, and decode them to address a specific one or more of respective bit lines 318 and 320. The word lines 322 are addressed through row control circuits 324 in response to addresses received on the address bus 306. Source voltage control circuits 326 and 328 are also connected with the respective planes, as are p-well voltage control circuits 330 and 332. If the bank 300 is in the form of a memory chip with a single array of memory cells, and if two or more such chips exist in the system, data are transferred into and out of the planes 310 and 312 through respective data input/output circuits 334 and 336 that are connected with the data portion 304 of the system bus 302. The circuits 334 and 336 provide for both programming data into the memory cells and for reading data from the memory cells of their respective planes, through lines 338 and 340 connected to the planes through respective column control circuits 314 and 316.

Although the processor 206 in the system controller 118 controls the operation of the memory chips in each bank 120 to program data, read data, erase and attend to various housekeeping matters, each memory chip also contains some controlling circuitry that executes commands from the controller 118 to perform such functions. Interface circuits 342 are connected to the control and status portion 308 of the system bus 302. Commands from the controller 118 are provided to a state machine 344 that then provides specific control of other circuits in order to execute these commands. Control lines 346-354 connect the state machine 344 with these other circuits as shown in FIG. 3. Status information from the state machine 344 is communicated over lines 356 to the interface 342 for transmission to the controller 118 over the bus portion 308.

A NAND architecture of the memory cell arrays 310 and 312 is discussed below, although other architectures, such as NOR, can be used instead. An example NAND array is illustrated by the circuit diagram of FIG. 4, which is a portion of the memory cell array 310 of the memory bank 300 of FIG. 3. A large number of global bit lines are provided, only four such lines 402-408 being shown in FIG. 4 for simplicity of explanation. A number of series connected memory cell strings 410-424 are connected between one of these bit lines and a reference potential. Using the memory cell string 414 as representative, a plurality of charge storage memory cells 426-432 are connected in series with select transistors 434 and 436 at either end of the string. When the select transistors of a string are rendered conductive, the string is connected between its bit line and the reference potential. One memory cell within that string is then programmed or read at a time.

Figure 4:
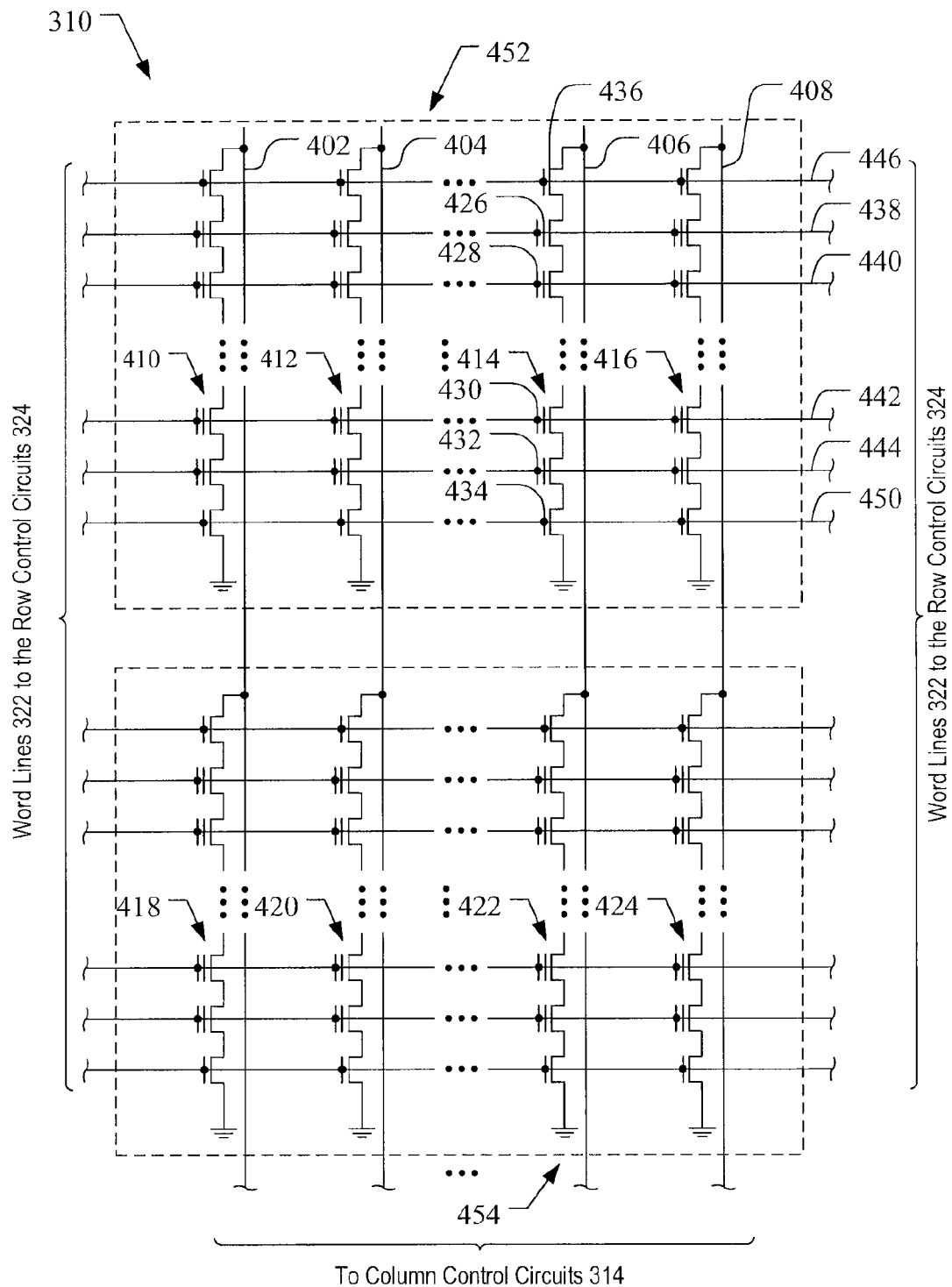
FIG. 4 is a representative circuit diagram of a memory cell array that may be used in the memory bank of FIG. 3.

Word lines 438-444 of FIG. 4 individually extend across the charge storage element of one memory cell in each of a number of strings of memory cells, and gates 446 and 450 control the states of the select transistors at each end of the strings. The memory cell strings that share common word and control gate lines 438-450 are made to form a block 452 of memory cells that are erased together. This block of cells contains the minimum number of cells that are physically erasable at one time. One row of memory cells, those along one of the word lines 438-444, are programmed at a time. Typically, the rows of a NAND array are programmed in a prescribed order, in this case beginning with the row along the word line 444 closest to the end of the strings connected to ground or another common potential. The row of memory cells along the word line 442 is programmed next, and so on, throughout the block 452. However, in other implementations, the rows of a NAND array are not programmed in sequential order for reasons such as reducing coupled between adjacent word lines.

A second block 454 is similar, its strings of memory cells being connected to the same global bit lines as the strings in the first block 452 but having a different set of word and control gate lines. The word and control gate lines are driven to their proper operating voltages by the row control circuits 324. If there is more than one plane in the system, such as planes 1 and 2 of FIG. 3, one memory architecture uses common word lines extending between them. There can alternatively be more than two planes that share common word lines. In other memory architectures, the word lines of individual planes are separately driven.

The memory cells may be operated to store two levels of charge so that a single bit of data is stored in each cell. This is typically referred to as a binary or single level cell (SLC) memory. Alternatively, the memory cells may be operated to store more than two detectable levels of charge in each charge storage element or region, thereby to store more than one bit of data in each. This latter configuration is referred to as multi level cell (MLC) memory. Both types of memory cells may be used in a memory, for example binary flash memory may be used for caching data and MLC memory may be used for longer term storage. The charge storage elements of the memory cells are most commonly conductive floating gates but may alternatively be non-conductive dielectric charge trapping material.

Figure 5:
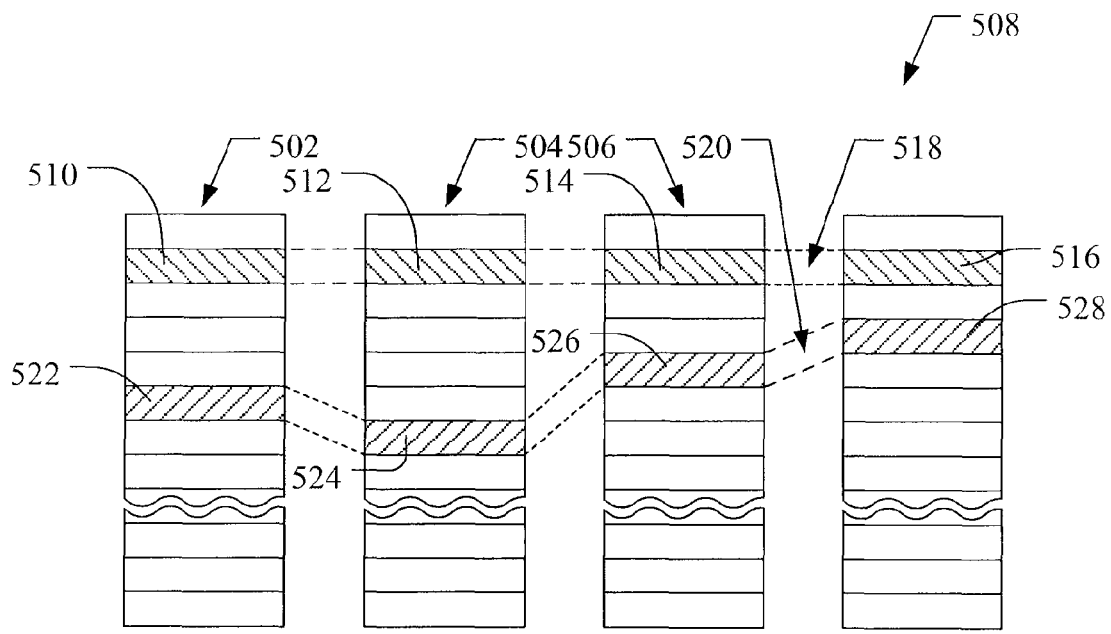
FIG. 5 illustrates an example physical memory organization of the memory bank of FIG. 3.

FIG. 5 conceptually illustrates a multiple plane arrangement showing four planes 502-508 of memory cells. These planes 502-508 may be on a single die, on two die (two of the planes on each die) or on four separate die. Of course, other numbers of planes, such as 1, 2, 8, 16 or more may exist in each die of a system. The planes are individually divided into blocks of memory cells shown in FIG. 5 by rectangles, such as blocks 510, 512, 514 and 516, located in respective planes 502-508. There can be dozens or hundreds of blocks in each plane.

As mentioned above, a block of memory cells is the unit of erase, the smallest number of memory cells that are physically erasable together. For increased parallelism, however, the blocks are operated in larger metablock units. One block from each plane is logically linked together to form a metablock. The four blocks 510-516 are shown to form one metablock 518. All of the cells within a metablock are typically erased together. The blocks used to form a metablock need not be restricted to the same relative locations within their respective planes, as is shown in a second metablock 520 made up of blocks 522-528. Although it is usually preferable to extend the metablocks across all of the planes, for high system performance, the memory system can be operated with the ability to dynamically form metablocks of any or all of one, two or three blocks in different planes. This allows the size of the metablock to be more closely matched with the amount of data available for storage in one programming operation.

Figure 6:
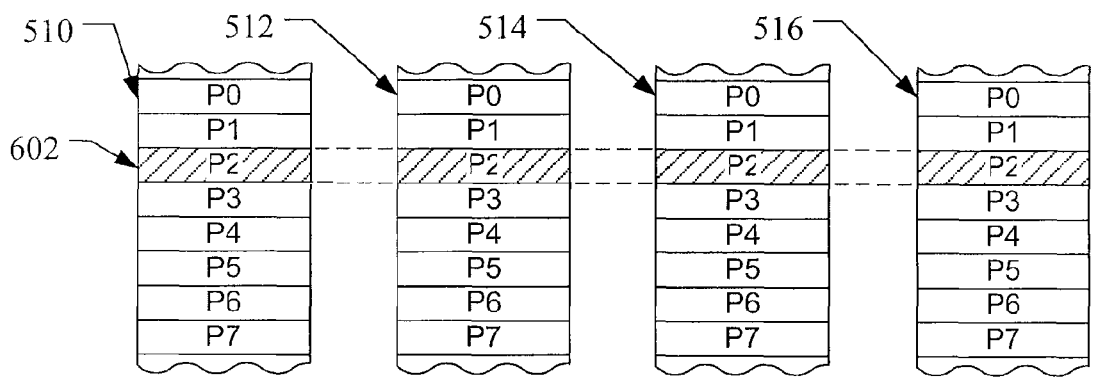
FIG. 6 shows an expanded view of a portion of the physical memory of FIG. 5.

The individual blocks are in turn divided for operational purposes into pages of memory cells, as illustrated in FIG. 6. The memory cells of each of the blocks 510-516, for example, are each divided into eight pages P0-P7. Alternatively, there may be 32, 64 or more pages of memory cells within each block. The page is the unit of data programming and reading within a block, containing the minimum amount of data that are programmed or read at one time. In the NAND architecture of FIG. 3, a page is formed of memory cells along a word line within a block. However, in order to increase the memory system operational parallelism, such pages within two or more blocks may be logically linked into metapages. A metapage 602 is illustrated in FIG. 6, being formed of one physical page from each of the four blocks 510-516. The metapage 602, for example, includes the page P2 in each of the four blocks but the pages of a metapage need not necessarily have the same relative position within each of the blocks.

As stated above, in order to increase an endurance of a memory, a controller located in a host device or a storage device may perform variable wear leveling by storing data blocks to at least a portion of a memory block until the portion of the memory block reaches a first end of life condition. After the portion of the memory block reaches the first end of life condition, the controller stores compressed data blocks to the portion of the memory block until the portion of the memory block reaches a second end of life condition. By only storing compressed data to the portion of memory block, the controller is able to increase the amount of parity bits that the controller may use with the data block in order to detect more errors in the stored data and extend the endurance of the memory block.

Figure 7:
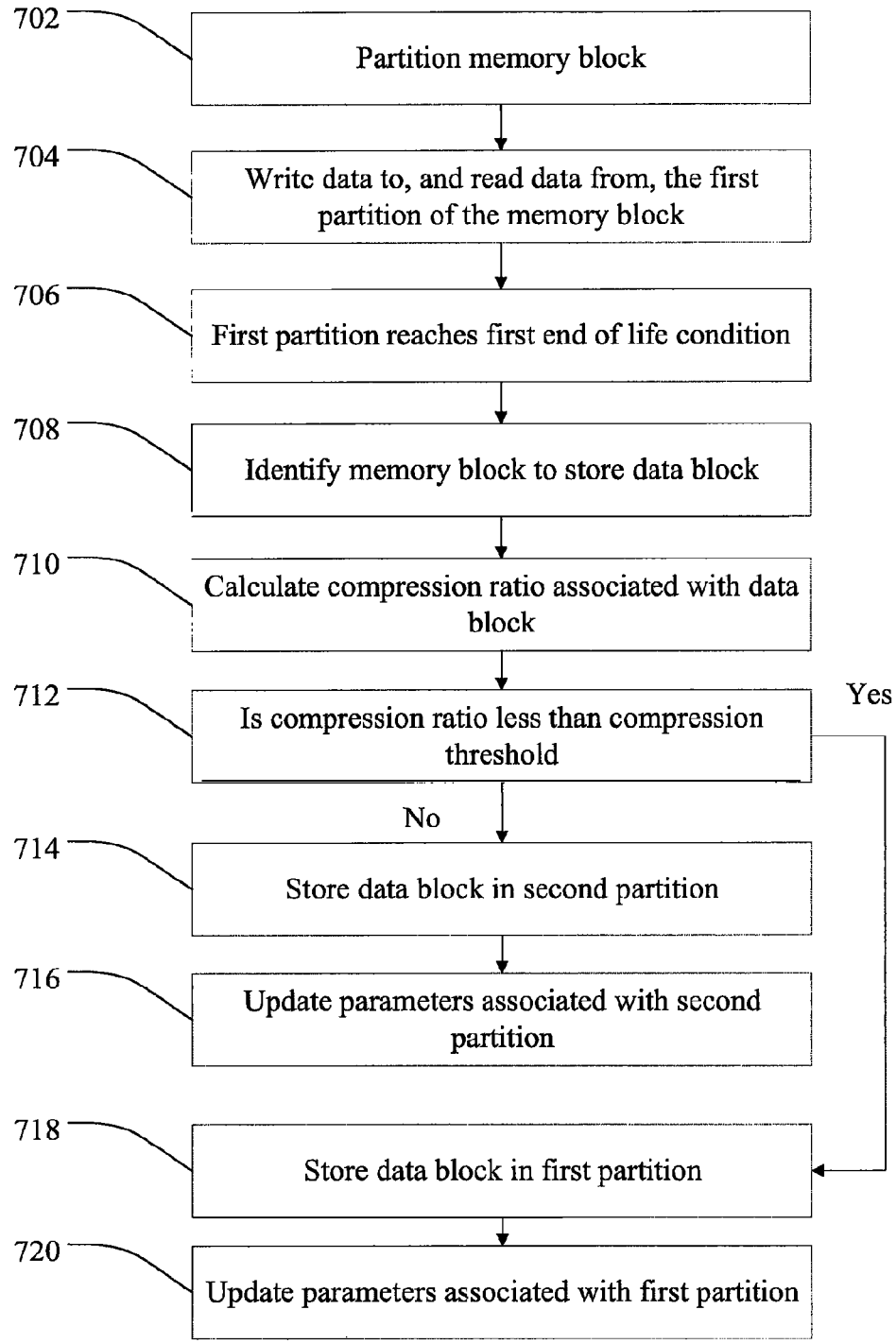
FIG. 7 is a flow chart of one implementation of a method for performing variable flash wear leveling.

FIG. 7 is a flow chart of one implementation of a method for performing variable wear leveling. The method begins at step 702 with a controller partitioning a memory block into a first partition and a second partition. The controller may partition the memory block into a first partition and a second partition based on factors such as an expected percentage of data blocks that will be associated with a compression ratio below a compression threshold associated with a partition of the memory blocks; an expected number of write/erase cycles associated with compressed data blocks vs. an expected number of write cycles associated with non-compressed data blocks; and/or any other factor that may be useful to a controller in determining how to partition a memory block.

At step 704, the controller interacts with the host to write data blocks to, and read data blocks from, the first partition of the memory block. The data blocks written to the first partition of the memory block may be both compressed and uncompressed data blocks. The controller continues to utilize the first partition of the memory block for the storage of data blocks until at step 706, the first partition of the memory block reaches a first end of life condition. In some implementations, the first end of life condition is an endurance threshold that is a function of a number of write and erase cycles enabled by an error correction code associated with the partition of the memory block.

After the first partition of the memory block reaches the first end of life condition, the controller utilizes the first partition of the memory block to store compressed data blocks until the first partition reaches a second end of life condition. In ideal conditions, the controller waits until the first partition of the memory block reaches the first end of life condition to utilize the second partition of the memory block to store other data blocks. However, in non-ideal conditions, the controller stores data blocks to the second partition before the first partition of the memory blocks reaches the first end of life condition. For example, in some circumstances, before the first partition reaches the first end of life condition, the controller may store data blocks to the second partition of memory when there is no other space available to the controller to store the memory block. The controller may continue to utilize the second partition until the second partition of the memory block reaches the first end of life condition.

The controller interacts with the host until at step 708, the controller receives a request to store a data block in the storage device and the controller identifies the memory block to store the data block based on factors such as the size of the data block and available space in the first and/or second partition of the memory block. At step 710, the controller calculates a compression ratio associated with the data block. In some implementations, the controller calculates the compression ratio based on a number of bytes of the data block after the data compression vs. the number of bytes of the data block before the data compression. As stated above, in the current application, the lower a compression ratio associated with a data block, the more the data block is compressed. In other words, a data block associated with a lower compression ratio is more compressed than a data block associated with a higher compression ratio.

At step 712, the controller determines whether the compression ratio associated with the data block is less than a compression threshold associated with the first partition of the memory block. In some implementations, a compression threshold is set such that a large portion of data blocks to be stored in the memory block with be compressed a sufficient amount for the controller to store the compressed data blocks in the first partition. It will be appreciated that when the compression threshold is set to a high threshold, a larger portion of data blocks may be saved to the partition, but there will not be a large increase in a number of parity bits that the controller may utilize to implement advanced error correction codes and check for errors in the data. Alternatively, when the compression threshold is set to a low threshold, a smaller portion of data blocks may be saved to the partition, but there will be an increased number of parity bits that the controller may utilize to implement advanced error correction codes and check for errors in the data.

If the controller determines at step 712 that the compression ratio associated with the data block does is equal to or greater than the compression threshold, the controller stores the data block in the second partition of the memory block at step 714. The controller may additionally update one or more parameters associated with the second partition at step 716 so that the controller may determine whether the second partition of the memory block has reached the first end of life condition.

If the controller determines at step 712 that the compression ratio associated with the data block is less than the compression threshold, the controller stores the data block in the first partition of the memory block at step 718. The controller may additionally update one or more parameters associated with the first partition at step 720 so that the controller may determine whether the first partition of the memory block has reached a second end of life condition. The second end of life condition may be an endurance threshold that is a function of a number of write and erase cycles enabled by an error correction code associated width the partition of the memory block.

By utilizing the first partition of the memory block to store compressed data, the controller is able to extend the normal lifespan of the first partition. Because compressed blocks are stored in the first partition, an increased number of bits are available for the controller to use as parity bits. By utilizing an increased number of parity bits, the controller is able to implement more advanced error correction codes to check for errors in the data stored in the first partition and extend the normal lifespan of the first partition.

It will be appreciated that after the first partition of the memory block has reached the first end of life condition, the controller will repeat the method described above starting at step 708 by utilizing the first partition of the memory block to store compressed data blocks until the first partition reaches the second end of life condition and utilizing the second partition of the memory block to store other data blocks until the second partition reaches the first end of life condition.

In some implementations, the controller may associate one or more wear level indicators with the first partition of memory to identify the state in which the first partition is operating. For example, in the example described above, the controller may associate a first wear level with the first partition until the first partition reaches the first end of life condition, the first wear level indicating that all data blocks may be written to the first partition; associate a second wear level with the first partition during a period of time between the first partition reaching the first end of life condition and the first partition reaching the second end of life condition, the second wear level indicating that only data blocks associated with a compression ratio that is less than the compression threshold associated with the first partition may be stored in the first partition; and associate a third wear level with the first partition after the first partition reaches the second end of life condition, the third wear level indicating that no data blocks may be written to the first partition.

While the example described above illustrates the first partition having three states, in other implementations, the first partition may have further states. For example, a storage system controller may use the first partition to store any type of data blocks until the first partition reaches a first end of life condition. After the first partition reaches the first end of life condition, the controller may store data blocks with a compression ratio that is less than a first compression threshold until the first partition reaches a second end of life condition. After the first partition reaches the second end of life condition, the controller may then store data blocks with a compression ratio that is less than a second compression threshold until the first partition reaches a third end of life condition. It will be appreciated that the second compression threshold will require that the data blocks stored in the first partition have a lower ratio of compression than that required by the first compression threshold to provide the controller additional parity bits to utilize in error correction codes and check for errors in the stored data. Finally, after the first partition reaches the third end of life condition, the controller may determine not to store further blocks to the first partition of the memory block.

Figure 8:
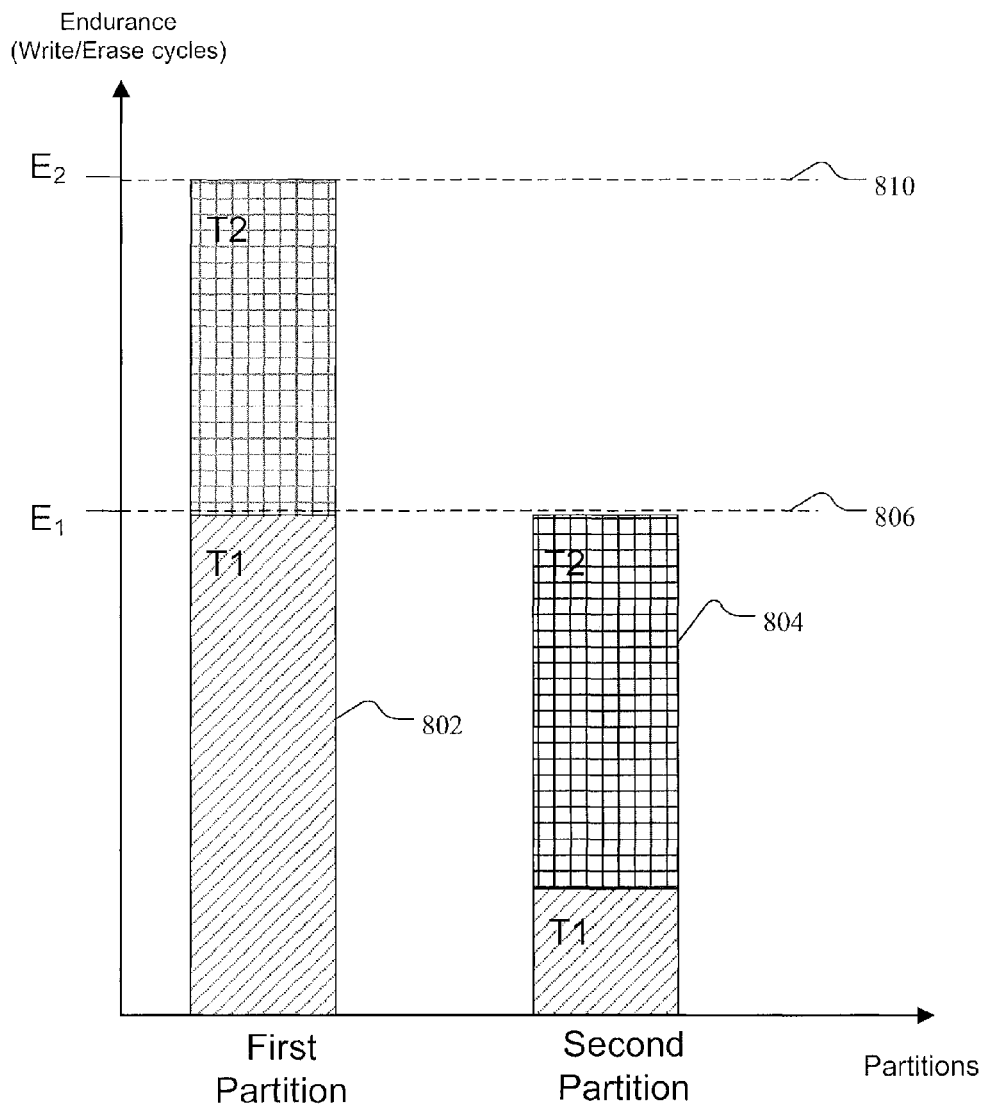
FIG. 8 is a graph illustrating an endurance of a memory block partitioned into a first partition and a second partition.

FIG. 8 is a graph illustrating an endurance of a memory block partitioned into a first partition 802 and a second partition 804. Continuing with the example described above in conjunction with FIG. 7, a controller stores data blocks in the first partition 802 during a first time period (T1) until the first partition 802 reaches a first end of life condition (a first endurance threshold) 806.

After the first partition 802 reaches the first end of life condition 806, the controller stores data blocks in the first partition 802 that are associated with a compression ratio that is less than a first compression threshold. The controller continues to store these data blocks in the first partition 802 during a second time period (T2) until the first partition 802 reaches a second end of life condition (a second endurance threshold) 810.

Additionally, the controller stores data blocks in the second partition 804. In ideal conditions, the controller stores data blocks in the second partition 804 only during the second time period (T2) after the first partition 802 has reached the first end of life condition 806. However, in non-ideal conditions as shown in FIG. 8, the controller stores some data blocks to the second partition 804 during the first time period (T1) and continues storing data blocks to the second partition 804 during the second time period (T2). The controller continues to store data blocks in the second partition 804 during the second time period (T2) until the second partition 804 reaches the second end of life condition 810.

Figure 9:
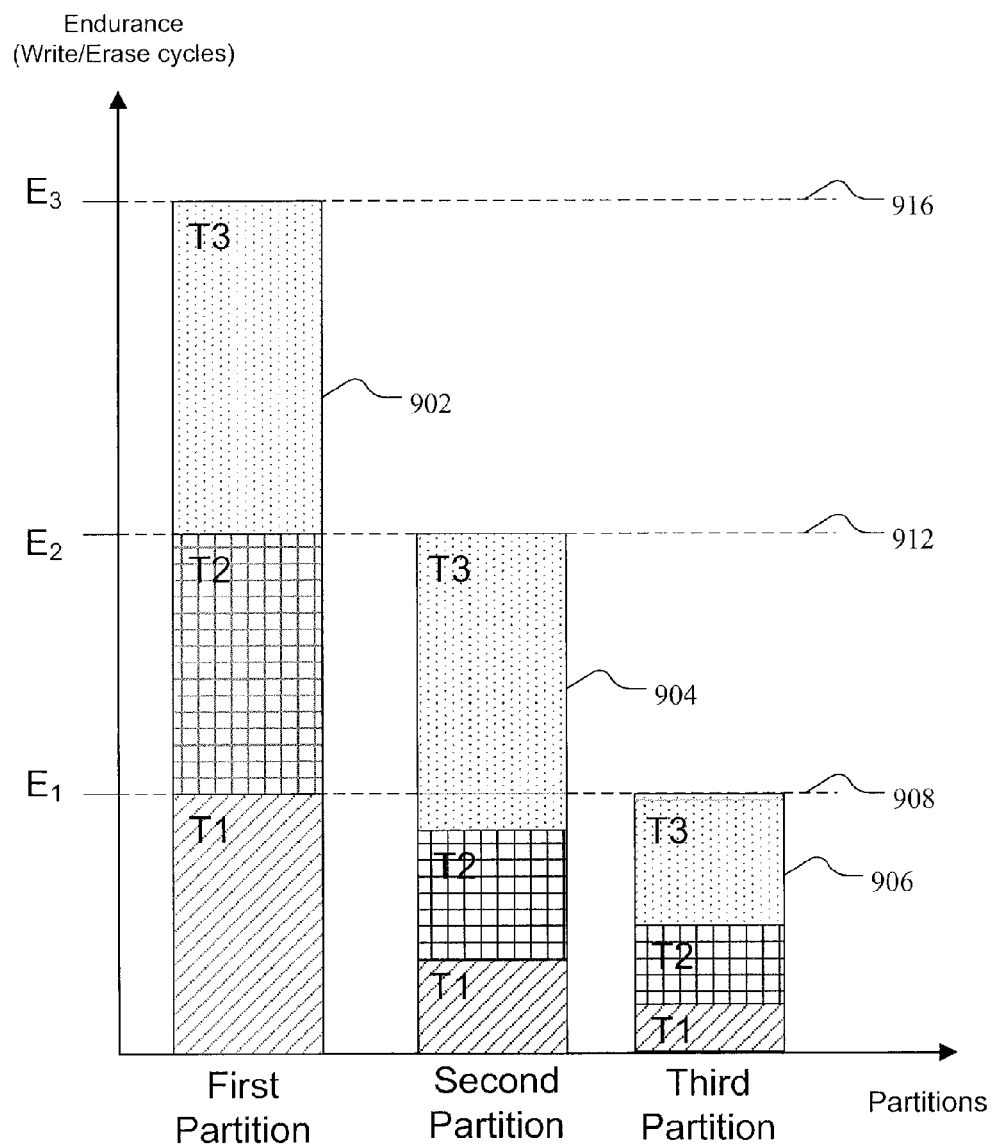
FIG. 9 is a graph illustrating an endurance of a memory block partitioned into a first partition, a second partition, and a third partition.

While the example described above in conjunction with FIGS. 7 and 8 describes a memory block being partitioned into a first partition and a second partition, in other implementations, the memory block may be partitioned into three or more partitions. FIG. 9 is a graph illustrating an endurance of a memory block partitioned into a first partition 902, a second partition 904, and a third partition 906. During a first time period (T1), a controller stores data blocks to the first partition 902, the second partition 904, and the third partition 906.

During the first time period, the controller stores data blocks to the first, second, and third partitions in an uneven manner such that the wear leveling of the first partition 902 is greater than the wear leveling of the second partition 904, and the wear leaving of the second partition 904 is greater than the wear leaving of the third partition 906. The controller continues to store data blocks to the first, second, and third partition until the first partition 902 reaches a first end of life condition (a first endurance threshold) 908.

After the first partition 902 reaches the first end of life condition 908, the controller stores data blocks in the first partition 902 that are associated with a compression ratio that is less than a first compression threshold. The controller continues to store these data blocks in the first partition 902 during a second time period (T2) until the first partition 902 reaches a second end of life condition (a second endurance threshold) 912.

Additionally, after the first partition 902 reaches the first end of life condition 908, the controller stores data blocks in the second partition 904 and the third partition 906 in an uneven manner such that the wear leveling of the second partition 904 is greater than the wear leveling of the third partition 906. The controller continues to store data blocks in this manner in the second and third partitions 904, 906 during the second time period (T2) until the first partition 902 reaches the second end of life condition 912 or the second partition reaches first end of life condition 908.

In FIG. 9, the first partition 902 reaches the second end of life condition 912 before the second partition 904 reaches the first end of life condition 908. However, it will be appreciated that in other implementations, the second partition 904 may reach the first end of life condition 908 prior to the first partition 902 reaching the second end of life condition 912. If the second partition 904 reaches the first end of life condition 912 prior to the end of the end of the second time period (T2), the controller may only store data blocks to the second partition 904 that are associated with a compression ratio that is less than the first compression threshold after the second partition 904 reaches the first end of life condition 912.

After the first partition 902 reaches the second end of life condition 912, the controller stores data blocks associated with a compression ratio that is less than a second compression threshold in the first partition 902. It will be appreciated that the second compression threshold is less than the first compression threshold so that the controller may utilize an increased number of parity bits to detect errors in the stored data and extend the endurance of the memory block. The controller continues to store these data blocks in the first partition 902 during a third time period (T3) until the first partition 902 reaches a third end of life condition (a third endurance threshold) 916.

Additionally, after the first partition 902 reaches the second end of life condition 912, the controller stores data blocks to the second partition 904 during the third time period (T3). If the second partition 904 has not yet reached the first end of life condition 908 at the beginning of the third time period (T3), the controller writes data blocks to the second partition 904 until the second partition 904 reaches the first end of life condition 908. After the second partition 904 reaches the first end of life condition 908, the controller writes data blocks associated with a compression ratio that is less than the first compression threshold to the second partition 904 until the second partition 904 reaches the second end of life condition 912. In some implementations, after the second partition 904 reaches the first end of life condition 908, the controller will only write data blocks to the second partition 904 that are associated with a compression ratio that is within a compression threshold range between the first compression threshold and the second compression threshold.

After the first partition 902 reaches the second end of life condition 912, the controller stores data block to the third partition 906. The controller continues to store data blocks to the third partition 906 during the third time period (T3) until the third partition 906 reaches the first end of life condition 908.

While the implementations described above teach a memory block being partitioned into multiple partitions, in other implementations, the controller does not partition each memory block into partitions. Instead, the controller associates two or more wear levels with the memory block for storing different types of data. For example, in one implementation, a controller may sequentially associate a memory block with a first wear level, a second wear level, a third wear level, and a fourth wear level. However, similar concepts may be implemented over any other number of wear levels.

Initially, the controller associates the memory block with a first wear level and utilizes the memory block to store both compressed and uncompressed data blocks. The controller proceeds to utilize the memory block in this manner until the memory block reaches a first end of life condition.

After the memory block reaches the first end of life condition, the controller may associate a second wear level with the memory block. Under the second wear level, the controller may utilize the memory block to store data blocks that are associated with a compression ratio that is less than a first compression threshold associated with the memory block. The controller proceeds to utilize the memory block in this manner under the second wear level until the memory block reaches a second end of life condition.

After the memory block reaches the second end of life condition, the controller may associate a third wear level with the memory block. Under the third wear level, the controller may utilize the memory block to store data blocks associated with a compression ratio that is less than a second compression threshold associated with the memory block. It will be appreciated that the second compression threshold will be less than the first compression threshold to provide the controller with the ability to use additional parity bits to detect errors in the stored data and extend the endurance of the memory block. The controller proceeds to utilize the memory block in this manner under the third wear level until the memory block reaches a third end of life condition.

After the memory block reaches the third end of life condition, the controller may associate a fourth wear level with the memory block. Under the fourth wear level, the controller may determine that the memory block should no longer be used to storage data.

The controller may implement the above-described wear leveling strategy across a plurality of memory blocks in the storage device, where each memory block is associated with a different wear level and the controller stores data blocks to different memory blocks based on a compression ratio associated with a data block and a compression threshold, or compression threshold range between two compression thresholds, associated with a memory block.

Figure 10:
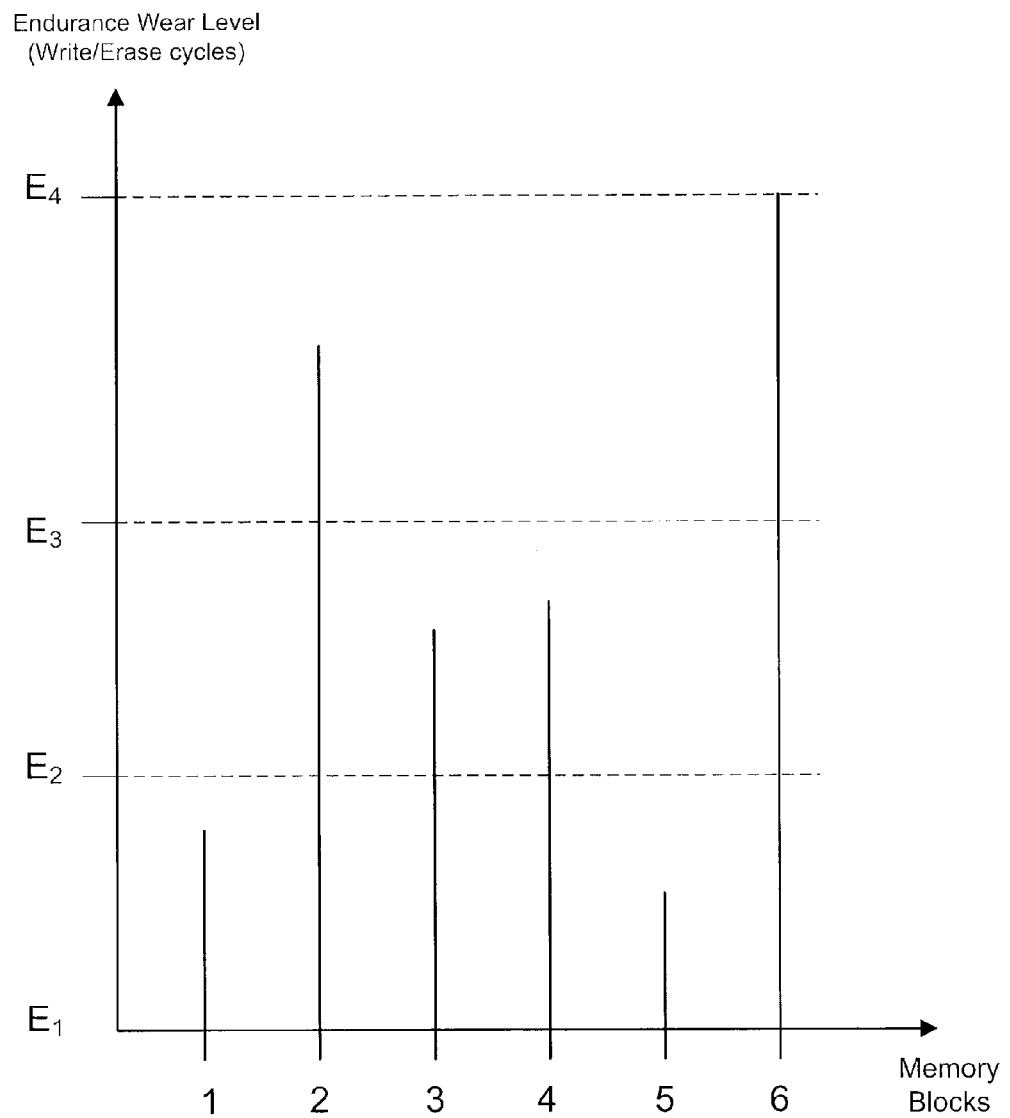
FIG. 10 is a graph illustrating a plurality of memory block associated with different wear levels.

FIG. 10 illustrates one example of a plurality of memory blocks and a wear level associated with the memory blocks. As shown in FIG. 10, memory blocks 1 and 5 are associated with a first wear level, under which the controller may store both compressed and uncompressed data blocks to the memory block; memory blocks 3 and 4 are associated with a second wear level, under which the controller may store data blocks associated with a compression ratio that is less than a first compression threshold; memory bock 2 is associated with a third wear level, under which the controller may store data blocks associated with a compression ratio that is less than a second compression threshold; and memory block 6 is associated with a fourth wear level, under which the controller no longer stores data blocks in the memory block.

In other implementations, it will be appreciated that one or more of the memory blocks may be associated with a compression threshold range between two compression threshold rather than only a single compression threshold. For example, in the example of FIG. 10, memory blocks 1 and 5 are associated with a first wear level, under which the controller may store both compressed and uncompressed data blocks to the memory block; memory blocks 3 and 4 are associated with a second wear level, under which the controller may store data blocks associated with a compression ratio that is within a first compression threshold range between a first compression threshold and a second compression threshold; memory block 2 is associated with a third wear level, under which the controller may store data blocks associated with a compression threshold that is less than the second compression threshold; and memory block 6 is associated with a fourth wear level, under which the controller no longer stores data blocks in the memory block.

Figure 11:
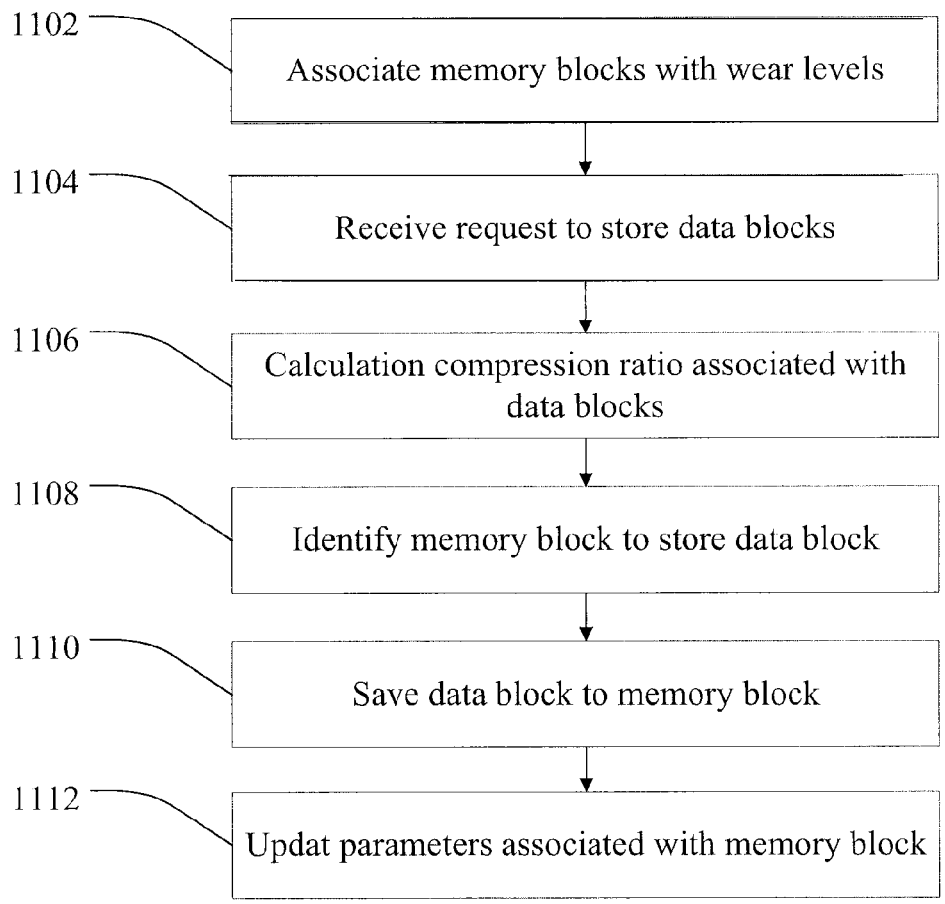
FIG. 11 is a flow chart of yet another implementation of a method for performing variable flash wear leveling.

FIG. 11 is a flow chart of one implementation of a method for performing variable wear leveling. The method begins at step 1102 with a controller associating each memory block of a plurality of memory blocks with a wear level. At step 1104 the controller interacts with a host and receives a request to store a data block in the storage device.

At step 1106, the controller calculates a compression ratio of the data block, and at step 1108, the controller identifies a memory block in which to store the data block based on factors such as the size of the memory block, free space in one or more of the memory blocks, the compression ratio associated with the data blocks, and/or the compression thresholds or compression threshold ranges associated with the memory blocks.

Continuing with the illustrative example of FIG. 10, a controller may determine, for example, that a compression ratio associated with a data block is less than the first compression threshold associated with memory blocks 3 and 4, but is not less than the second compression ratio associated with memory block 2. Accordingly, the controller may determine whether to store the data block in memory block 3 or memory block 4 based on an amount of free space in memory blocks 3 or 4.

Continuing with the illustrative example of FIG. 10, the controller may determine, for example, that a compression ratio associated with the data block is less than the first compression threshold associated with memory blocks 3 and 4, and that the compression ratio associated with the data blocks is less than the second compression threshold associated with memory block 2. The controller may then determine whether to store the data block in memory block 2, memory block 3, or memory block 4 based on factors such as an amount of free space in any of the three memory blocks; preferences such as storing the data block in the memory block with the highest possible wear level; and/or an expected amount of data blocks, based on prior statistical knowledge, to be stored in each memory block based on a compression threshold or compression threshold range associated with the memory block.

Referring again to FIG. 11, at step 1110, the controller saves the data block in the memory block identified at step 1108. At step 1112, the controller may then update one or more parameters associated with the memory block identified at step 1108 so that the controller may determine if the memory block has reached a new end of life condition. It will be appreciated that the above-described process may then be repeated each time a controller receives a request to store a data block in the storage system.

FIGS. 1-11 illustrate systems and methods for performing variable flash wear leveling. As explained above, a controller utilizes at least a portion of a memory block to store data blocks until the portion of the memory block reaches a first end of life condition. To extend the life of the portion of the memory block, after the memory block reaches the first end of life condition, the controller only stores compressed data blocks to the portion of the memory block until the memory block reaches a second end of life condition. By storing only compressed data blocks in the portion of the memory block after the memory block reaches the first end of life condition, the controller is able to use an increased number of parity bits to detect errors in the stored data and extend the endurance of the memory block.

It is intended that the foregoing detailed description be regarded as illustrative rather than limiting, and that it be understood that it is the following claims, including all equivalents, that are intended to define the spirit and scope of this invention.

The invention claimed is:
1. A method for performing wear leveling, the method comprising:
partitioning a memory block of a storage device into at least a first partition and a second partition;

utilizing the first partition of the memory block for storage of data blocks with an error correction code until the first partition reaches a first end of life condition;

after the first partition reaches the first end of life condition:
  utilizing the first partition for storage of data blocks associated with a compression ratio that is less than a compression threshold until the first partition reaches a second end of life condition, where the data blocks stored in the first partition after the first end of life condition are stored with an advanced error correction code that utilizes more parity bits stored in the first partition than the error correction code utilized prior to the first end of life condition; and
  utilizing the second partition for the storage of data blocks until the second partition reaches the first end of life condition.

2. The method of claim 1, wherein the first end of life condition is an endurance threshold associated with a partition of the memory block.

3. The method of claim 2, wherein the endurance threshold is based on a number of write and erase cycles enabled by an error correction code associated with a partition of the memory block.

4. The method of claim 1, wherein utilizing the first partition for storage of data blocks associated with a compression ratio that is less than a compression threshold comprises:
  receiving a request to store data blocks in the storage device;
  determining a compression ratio associated with the data blocks;
  determining whether the compression ratio associated with the data blocks is less than a compression threshold associated with the first partition; and
  storing the data blocks in the first partition in response to determining the compression ratio associated with the data blocks is less than the compression threshold associated with the first partition.

5. The method of claim 1, wherein utilizing the second partition for the storage of data blocks comprises:
  receiving a request to store data blocks in the storage device;
  determining a compression ratio associated with the data blocks;
  determining whether the compression ratio associated with the data blocks is less than a compression threshold associated with the first partition; and
  storing the data blocks in the second partition in response to determining the compression ratio associated with the data blocks is not less than the compression threshold associated with the first partition.

6. The method of claim 1, wherein the first partition is associated with a first wear level until the first partition reaches the first end of life condition, the first wear level indicating that all data blocks may be written to the first partition;
  wherein the first partition is associated with a second wear level after the first partition reaches the first end of life condition but before the first partition reaches the second end of life condition, the second wear level indicating that only data blocks associated with a compression ratio that is less than the compression threshold may be written to the first partition; and
  wherein the first partition is associated with a third wear level after the first partition reaches the second end of life condition, the third wear level indicating that no data blocks may be written to the first partition.

7. A storage system comprising:
a non-volatile memory; and
a processor in communication with the non-volatile memory, the processor configured to:
  partition a memory block of the non-volatile memory into at least a first partition and a second partition;
  utilize the first partition of the memory block to store data blocks with an error correction code until the first partition reaches a first end of life condition;
  after the first partition reaches the first end of life condition:
    utilize the first partition for storage of data blocks associated with a compression ratio that is less than a compression threshold until the first partition reaches a second end of life condition, where the data blocks stored in the first partition after the first end of life condition are stored with an advanced error correction code that utilizes more parity bits stored in the first partition than the error correction code utilized prior to the first end of life condition; and
    utilize the second partition for the storage of data blocks until the second partition reaches the first end of life condition.

8. The storage system of claim 7, wherein the first end of life condition is an endurance threshold that is based on a number of write and erase cycles enabled by an error correction code associated with a partition of the memory block.

9. The storage system of claim 7, wherein to utilize the first partition for storage of data blocks associated with a compression ratio that is less than a compression threshold, the processor is further configured to:
  receive a request to store data blocks in the storage device;
  determine a compression ratio associated with the data blocks;
  determine whether the compression ratio associated with the data blocks is less than a compression threshold associated with the first partition; and
  store the data blocks in the first partition in response to determining the compression ratio associated with the data blocks is less than the compression threshold associated with the first partition.

10. The storage system of claim 7, wherein to utilize the first partition for storage of data blocks associated with a compression ratio that is less than a compression threshold, the processor is further configured to:
  receive a request to store data blocks in the storage device;
  determine a compression ratio associated with the data blocks;
  determine whether the compression ratio associated with the data blocks is less than a compression threshold associated with the first partition; and
  store the data blocks in the second partition in response to determining the compression ratio associated with the data blocks is not less than the compression threshold associated with the first partition.

11. A method for performing wear leveling, the method comprising:
  associating a first memory block of a storage device with a first compression threshold, wherein the first memory block implements an error correction code;
  associating a second memory block of the storage device with a second compression threshold, wherein the second compression threshold is less than the first compression threshold, wherein the second memory block implements a less advanced error correction code that utilizes less parity bits than the error correction code implemented with the first memory block and wherein the first memory block has reached a first end of life condition and the second memory block has not reached the first end of life condition;

receiving a request to store data blocks in the storage device;

determining a compression ratio associated with the data blocks; and determining whether to store the data blocks in the first memory block or the second memory block based on the compression ratio associated with the data blocks and the first and second compression thresholds.

12. The method of claim 11, further comprising:
storing the data blocks in the second memory block after determining that the compression ratio associated with the data blocks is not less than the first compression threshold.

13. The method of claim 11, further comprising:
storing the data blocks in the first memory block after determining that the compression ratio associated with the data blocks is less than the first compression threshold.

14. The method of claim 12, further comprising:
storing the data blocks in a third memory block of the storage device after determining that the compression ratio associated with the data blocks is not less than the first compression threshold and determining that the compression ratio associated with the data blocks is not less than the second compression threshold.

15. The method of claim 11, further comprising:
determining that the first memory block has reached a second end of life condition; and
associating the first memory block with a third compression threshold, wherein the third compression threshold is less than the first compression threshold.

16. The method of claim 11, further comprising:
determining that the second memory block has reached the first end of life condition; and
associating the second memory block with a third compression threshold, wherein the third compression threshold is equal to the first compression threshold.

17. A storage device comprising:
a non-volatile memory; and
a processor in communication with the non-volatile memory, the processor configured to:
associate a first memory block of the non-volatile memory with a first compression threshold, wherein the first memory block implements an error correction code;
associate a second memory block of the non-volatile memory with a second compression threshold, wherein the second compression threshold is less than the first compression threshold, wherein the second memory block implements a less advanced error correction code that utilizes less parity bits than the error correction code implemented with the first memory block and wherein the first memory block has reached an end of life condition and the second memory block has not reached the end of life condition;
receive a request to store data blocks in the storage device;
determine a compression ratio associated with the data blocks; and
determine whether to store the data blocks in the first memory block or the second memory block based on the compression ratio associated with the data blocks and the first and second compression thresholds.

18. The storage device of claim 17, wherein the processor is further configured to:
store the data blocks in the second memory block after determining that the compression ratio associated with the data blocks is not less than the first compression threshold.

19. The storage device of claim 17, wherein the processor is further configured to:
store the data blocks in the first memory block after determining that the compression ratio associated with the data blocks is less than the first compression threshold.

20. The storage device of claim 17, wherein the processor is further configured to:
store the data blocks in a third memory block of the non-volatile memory after determining that the compression ratio associated with the data blocks is not less than the first compression threshold and determining that the compression ratio associated with the data blocks is not less than the second compression threshold.

* * * * *